United States Patent [19]
Iwasaki

[11] Patent Number: 6,068,390
[45] Date of Patent: May 30, 2000

[54] LAMP UNIT FOR VEHICLE

[75] Inventor: Masahito Iwasaki, Shizuoka, Japan

[73] Assignee: Koito Manufacturing Co., Ltd., Tokyo, Japan

[21] Appl. No.: 09/082,051

[22] Filed: May 20, 1998

[30] Foreign Application Priority Data

May 21, 1997 [JP] Japan ................................... 9-130819

[51] Int. Cl.⁷ ................................................. B60Q 1/26
[52] U.S. Cl. ........................ 362/506; 362/487; 362/509; 362/516
[58] Field of Search .................... 362/506, 509, 362/510, 516, 518, 519, 487

[56] References Cited

U.S. PATENT DOCUMENTS

| | | | |
|---|---|---|---|
| 3,603,928 | 9/1971 | Speedy et al. | 362/506 |
| 3,809,880 | 5/1974 | Daumueller et al. | 362/517 |
| 4,195,245 | 3/1980 | Miyazawa | 313/113 |
| 4,198,674 | 4/1980 | Ilhage et al. | 362/544 |
| 4,912,606 | 3/1990 | Yamamoto | 362/518 |
| 5,084,805 | 1/1992 | Goto | 362/510 |
| 5,307,246 | 4/1994 | Schmid et al. | 362/518 |
| 5,418,695 | 5/1995 | Yoshida | 362/518 |
| 5,566,057 | 10/1996 | Iwami | 362/509 |
| 5,707,132 | 1/1998 | Ooki et al. | 362/522 |

FOREIGN PATENT DOCUMENTS

| | | | |
|---|---|---|---|
| 0071583 | 2/1983 | European Pat. Off. | 362/510 |
| 098062 A1 | 1/1984 | European Pat. Off. | 362/516 |
| 3400269 | 7/1984 | Germany | 362/516 |
| 3322181 | 1/1985 | Germany | 362/516 |

*Primary Examiner*—Cassandra Spyrou
*Assistant Examiner*—John Juba, Jr.
*Attorney, Agent, or Firm*—Sughrue, Mion, Zinn, Macpeak & Seas, PLLC

[57] ABSTRACT

A lamp unit for a vehicle incorporating a reflector disposed on the inside of a case-shape lamp body; a bulb disposed in front of the reflector and serving as a light source; and a front lens joined to and integrated with a front opening of the lamp body, the lamp unit for a vehicle being joined to a corner portion of the body of the vehicle, wherein the bulb is disposed horizontally with respect to the axis of the vehicle. Thus, the bulb insertion hole is omitted from the rear portion of the bulb so that the overall surface of the lamp body in the rear of the bulb is made to be the effective reflecting surface. As a result, the quantity of light which is emitted from the lamp can be enlarged.

7 Claims, 4 Drawing Sheets

LAMP UNIT FOR VEHICLE

BACKGROUND OF THE INVENTION

1. Field of the Invention

The present invention relates to a lamp unit for a vehicle, and more particularly to a lamp unit for a vehicle which is disposed in each of front or rear corner portions.

2. Related Art

Hitherto, each of lamp units for a vehicle, such as clearance lamps, turn signal lamps and hazard lamps, which are disposed in front or rear corner portions of a vehicle, has a structure, for example, as shown in FIG. 5.

FIG. 5 shows a turn signal lamp comprising a case-shape lamp body 1 incorporating therein a reflector 2 having an aluminum-evaporated inner surface and formed integrally with the lamp body 1, a bulb 3 received by a bulb insertion hole 1a formed in the lamp body 1 and a front lens 4 joined to a front opening portion of the lamp body 1.

Reference numeral 5 represents an amber color cap mounted to cover the bulb 3 so that light emitted from the bulb 3 is changed to amber.

When the bulb 3 has been turned on, light is mainly reflected by the reflector 2. Then, light emits forward through the lens 4, as indicated with an arrow shown in FIG. 5. On the other hand, a portion of light is not reflected by the reflector 2. The portion of light directly emits toward the front through the front lens 4. Thus, the visibility from front portions can be improved.

Moreover, the above-mentioned structure is arranged in such a manner that the outer portion of the color cap 5 is subjected to a lens cutting process or the like in order to improve a light diffusion characteristic to the side portions.

The above-mentioned structure has the arrangement that the bulb insertion hole 1a opened in the direction of the axis of the vehicle is formed at substantially a central portion in the horizontal direction of the lamp body 1 (the reflector 2). Moreover, the bulb 3 is longitudinally disposed (mounted in parallel to the direction of the axis of the vehicle). Therefore, the rear portion of the bulb 3 of the reflector 2 is not effective to reflect Light. Thus, the area of the effective reflecting surface of the reflector 2 is reduced. As a result, there arises a problem in that the quantity of light obtainable from the lamp is unsatisfactorily small. It is a known fact that the obtainable quantity of light is determined by the size of the lamp body 1 (the reflector 2). Therefore, the above-mentioned tendency becomes more critical as the size of the lamp body is reduced.

The above-mentioned structure is arranged such that the color cap 5 is subjected to the lens cutting process or the like to enlarge the quantity of light which can emit sidewardly. The diffusion effect realized by the lens cutting process causes only direct light emitted by the bulb to be diffused. Therefore, the overall quantity of the reflecting-type lamp having the reflector which realizes a required quantity cannot be enlarged.

SUMMARY OF THE INVENTION

An object of the present invention is to provide a lamp unit for a vehicle which is capable of solving the above-mentioned problem and having a structure that the effective area of the reflector is enlarged within a limited capacity of the reflector so as to be capable of enlarging the quantity of light.

The above-mentioned and other objects can be accomplished by a provision of a lamp unit for a vehicle comprising a reflector disposed on the inside of a case-shape lamp body; a bulb disposed in front of the reflector and serving as a light source; and a front lens joined to and integrated with a front opening of the lamp body, the lamp unit for a vehicle being joined to a corner portion of the body of the vehicle, wherein the bulb is disposed horizontally with respect to the axis of the vehicle.

Since the overall surface of the reflector disposed in the rear of the bulb disposed horizontally with respect to the axis of the vehicle is made to be en effective reflecting surface, the area of the effective reflecting surface of the reflector can be enlarged as compared with a conventional lamp unit incorporating a bulb disposed longitudinally. As a result, the quantity of light obtainable in the direction of the axis of the vehicle can be enlarged.

In particular, energy of light emitting from the bulb is maximized at a position confronting the side surface of the bulb. Emitting light having the maximum energy is reflected by the reflector region in the rear of the bulb so that the quantity of light is enlarged.

Further, according to the invention, since the bulb is disposed in a direction perpendicular to the direction of the axis of the vehicle, the effective reflecting area of the reflector can be maximized. Moreover, light having the largest energy can be reflected and distributed forwards.

Still further, according to the invention, the reflector is formed integrally with the inside portion of the lamp body, an inner side wall of the lamp body in the direction of the width of the vehicle is expanded inwards (outwards in the direction of the width of the vehicle) and a bulb insertion hole is formed in the inner expanded portion. The side wall of the lamp body expanded inwards enlarges the space for accommodating the lamp unit disposed adjacent on the inside of the direction of the width of the vehicle.

Moreover, the inner expanded portion of the lamp body has a horizontal cross sectional shape formed into a circular arc for horizontally diffusing light emitted from the bulb. The surface region of the inner expanded portion of the reflector diffuses and reflects light to the right and left.

PREFERRED EMBODIMENT OF THE INVENTION

Figure 1:
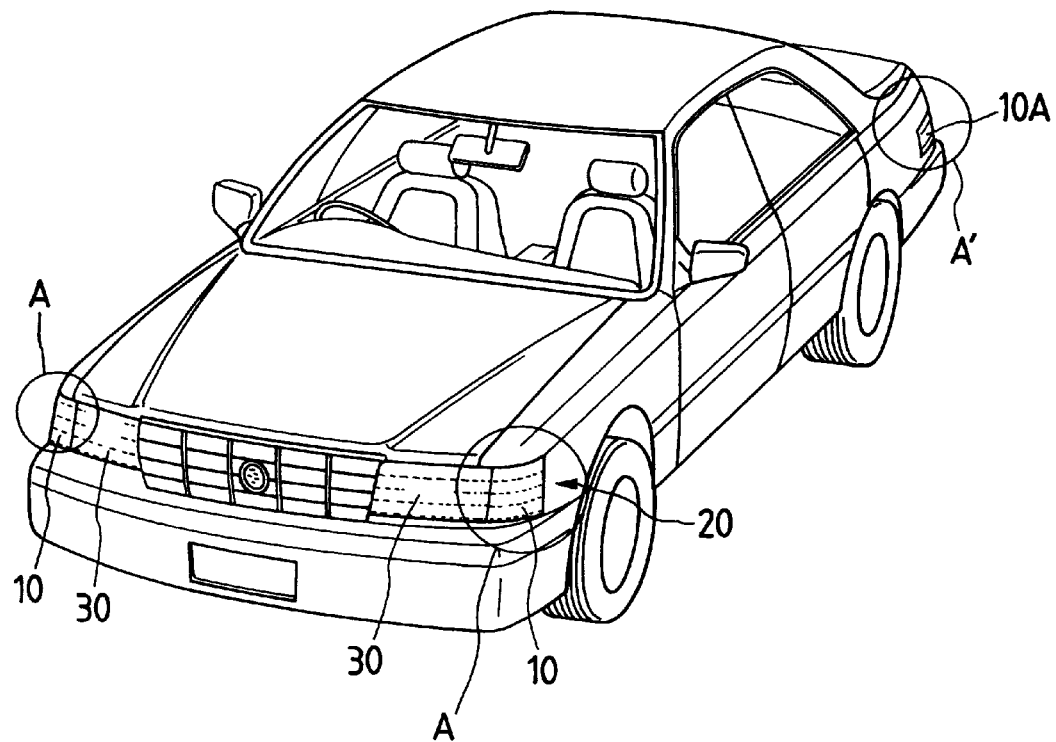
FIG. 1 is a perspective view showing an automobile to which a turn signal lamp according to the present invention is applied.

A preferred embodiment of the present invention will now be described with reference to the drawings. FIG. 1 shows an automobile to which the present invention is applied. In a corner portion of a vehicle enclosed in a circle A at each of the right and left sides of the front portion of the automobile, a turn signal lamp 10 according to an embodiment of the present invention is disposed in such a manner that a continuous curved surface is formed between a front fender 20 and a head lamp 30. As a matter of course, the present invention may be applied to a turn signal lamp 10A in the rear corner portion enclosed in circle A'.

Figure 2:
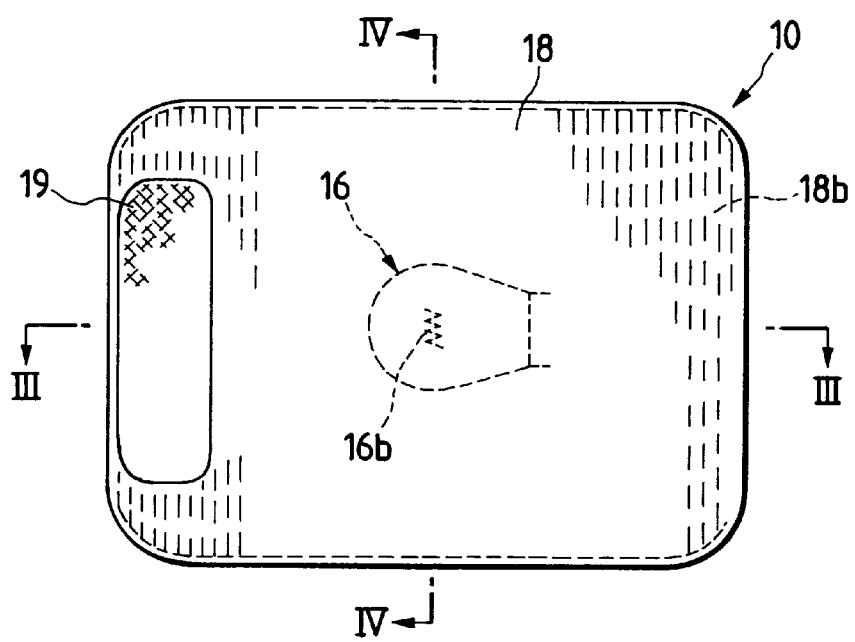
FIG. 2 is a front view showing the turn signal lamp enclosed by circle A shown in FIG. 1 and according to the present invention.
Figure 3:
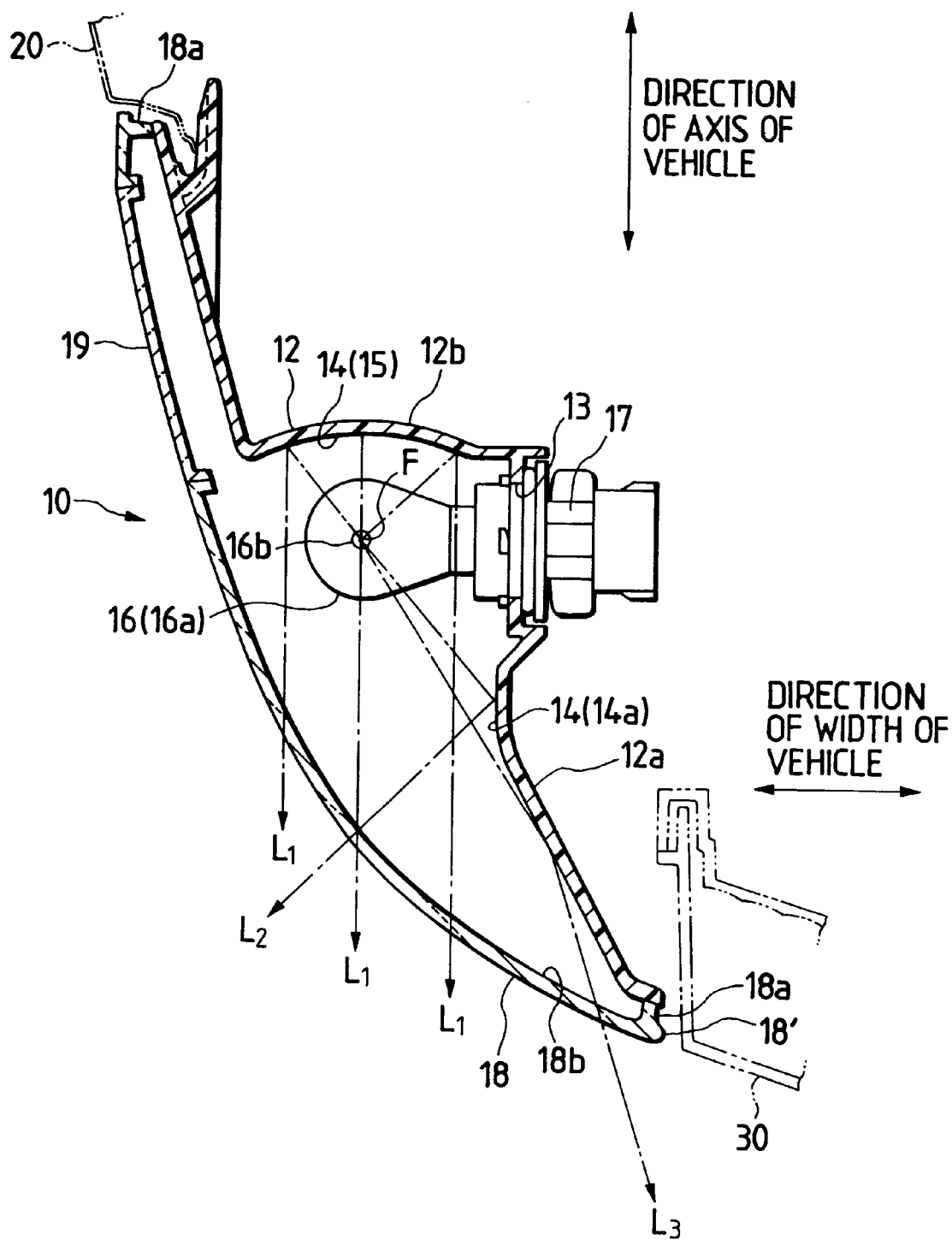
FIG. 3 is a horizontal cross sectional view (a cross sectional view taken along line III—III shown FIG. 2) of the foregoing lamp.
Figure 4:
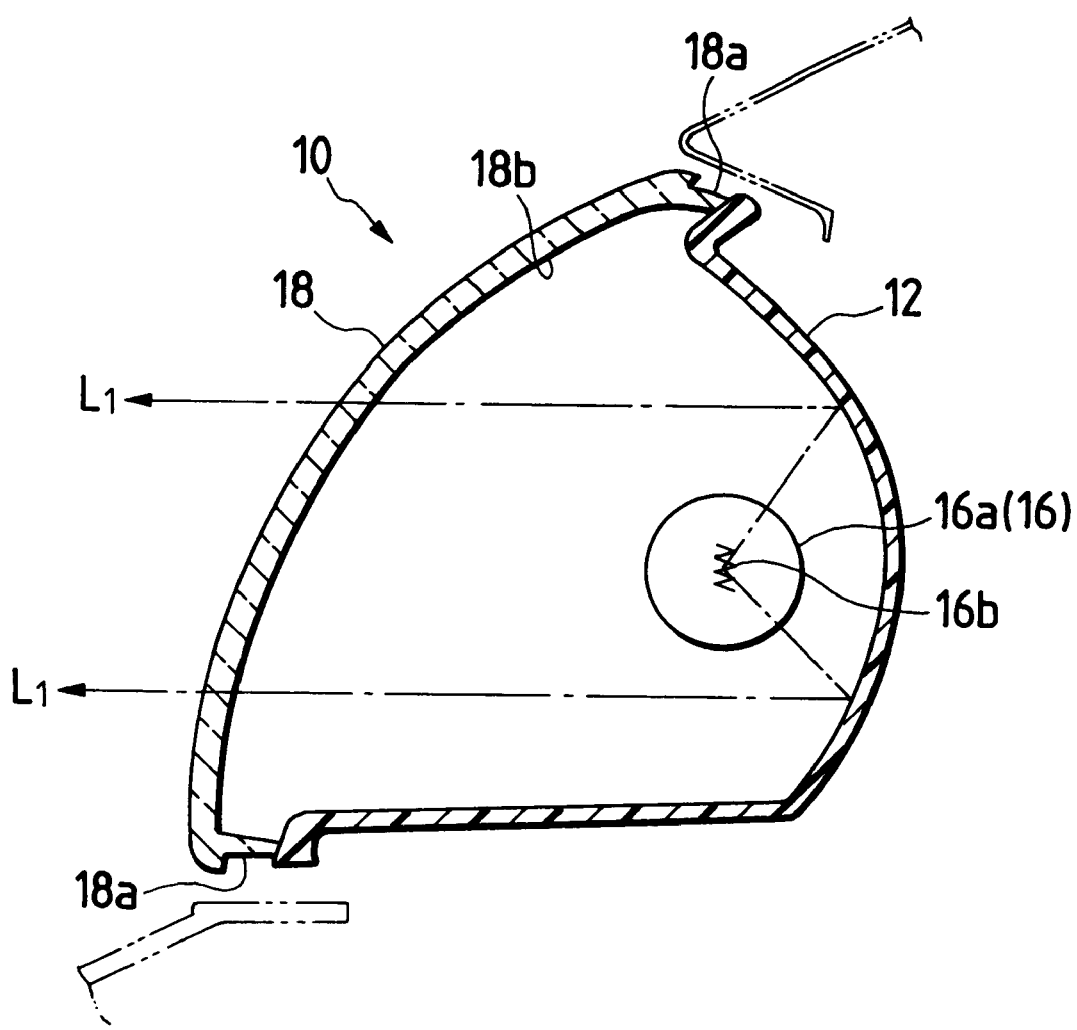
FIG. 4 is a vertical cross sectional view (a cross sectional view taken along line IV—IV shown in FIG. 2) of the foregoing lamp.
Figure 5:
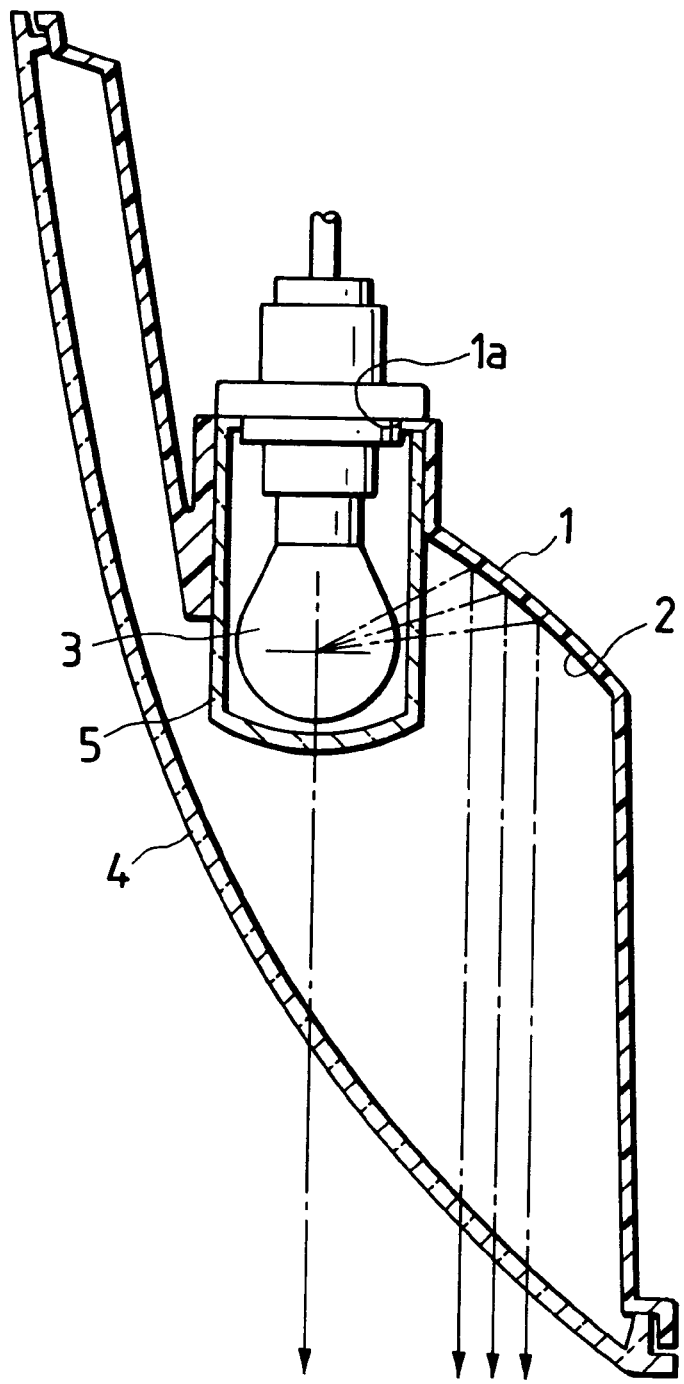
FIG. 5 is a horizontal cross sectional view showing a conventional lamp.

As shown in FIGS. 2 to 4, the turn signal lamp 10 comprises a case-shape lamp body 12 incorporating a reflecting surface 14 formed integrally with the inner surface thereof and a bulb 16 received by a bulb insertion hole 13 formed in the lamp body 12 and serving as a light source. Moreover, the turn signal lamp 10 has a front lens 18 joined integrally with a front opening portion of the lamp body 12 and curved to be continued from the outer surface of a car body (a front fender 20) and the outer surface of the adjacent head lamp 30.

The lamp body 12 is in the form of a molded member made of synthetic resin. A reflecting surface 14 is aluminum-evaporated on the overall inner surface of the lamp body 12. As shown in FIGS. 3 and 4, a reflector 15 having a focal point at a forward position in the direction of the axis of the vehicle and formed into a parabolic shape is integrally formed with the lamp body 12.

The front lens 18 is in the form of an amber member molded from synthetic resin. A sealing leg 18a formed in the periphery of the front lens 18 is integrally secured to the periphery of the lamp body 12 by heat welding. As indicated with a dashed line shown in FIG. 2, horizontal diffusion steps (cylindrical steps) 18b are formed so that light emitted through the front lens 18 is diffused and distributed to the right and left. Moreover, a reflex reflector 19 is formed on the outside of the front lens 18 in the direction of the width of the vehicle, that is, adjacent to the front fender 20. Thus, light from the outside can be reflected by the reflex reflector 19.

An inner side wall 12a of the lamp body 12 in the direction of the width of the vehicle is formed into a shape expanding more inwards (toward the outside portion in the direction of the width of the vehicle) than an inner end portion 18' of the front lens 18 in the direction of the width of the vehicle. Moreover, a bulb insertion hole 13 opened in a direction perpendicular to the direction of the axis of the vehicle (opened in the direction of the width of the vehicle) is, differently from the conventional structure, formed in a flat portion of the side wall 12a continued to the reflector 15. When a socket portion 17 of the bulb 16 is received by the bulb insertion hole 13, the bulb 16 is disposed horizontally, that is, in a direction perpendicular to the direction of the axis of the vehicle (in the direction of the width of the vehicle). Thus, a filament 16b which is the center of the bulb 16 coincides with the focal point F of the reflecting surface 14.

Therefore, only a glass bulb 16a of the bulb 16 is located in front of the reflector 15. Portions hidden by the reflector 15, that is, for example a socket portion 17, are displaced from the front surface of the reflector 15. As a result, the overall surface of the reflector 15 can be used as the effective reflecting surface.

The filament 16b of the bulb 16 is disposed at the position of the focal point F of the reflector 15 as if the filament 16b is suspended in the vertical direction (see FIG. 4). Thus, the reflector 15 confronts the filament 16b of the bulb 16 having the largest energy. Therefore, light emitted from the bulb 16 (the filament 16b) is totally reflected by the reflector 15 so that reflected light is formed into parallel beams, as indicated with symbol Li shown in FIGS. 3 and 4. Then, the parallel beams are emitted in the direction of the axis of the vehicle through the front lens 18. Thus, the quantity of light with which the front portion of the vehicle is irradiated can be enlarged.

The side wall 12a of the lamp body 12 is formed into a curved shape having a horizontal cross section expanded inwards. Therefore, also a reflecting surface 14a formed integrally with the inside portion of the side wall 12a is formed into a gently curved surface expanded inwards. The curved shape of the reflecting surface 14a expanded inwards is designed by optical calculations performed in consideration of the position of the glass bulb 16a of the bulb 16 and the degree of light diffusion. Thus, light emitted from the bulb 16 is forwards diffused and reflected from the side portion of the vehicle as indicated with symbols $L_2$ and $L_3$ shown in FIG. 3 in accordance with the designed curved shape. Thus, wide visibility can be obtained.

Although the above-mentioned embodiment has the structure that the bulb 16 is disposed in a direction perpendicular to the axis of the vehicle (in the direction of the width of the vehicle), the necessity of accurately disposing the bulb 16 in the perpendicular direction can be eliminated if the design of the car body requires the foregoing structure. If the bulb 16 is somewhat inclined with respect to the axis of the vehicle, the effective reflecting area of the reflector can satisfactorily be enlarged as compared with the conventional structure unless the bulb insertion hole 13 is formed in the reflector 15.

As described above, the lamp unit for a vehicle according to the invention is capable of enlarging the area of the effective reflecting surface of the reflector and causes light emitted from the bulb and having the largest energy to effectively be emitted forwards. Therefore, the quantity of light which is emitted in the direction of the axis of the vehicle can be enlarged. As a result, the visibility of the lamp unit can be improved.

Further, the effective reflecting area of the reflector can be maximized and light emitted from the bulb and having the largest energy can reliably be used. Thus, the visibility can furthermore be improved.

Moreover, since the lamp body is expanded inwards, interference with adjacent lamp can be prevented. Moreover, the space in the car body for accommodating the lamp can be enlarged. Therefore, the degree of freedom for disposing the lamp can be improved.

Acording to the invention, since light to be diffused and distributed also sidewards, also the visibility from side portions can be improved.

What is claimed is:

1. A lamp unit disposed at a corner portion of a vehicle comprising:
   a lamp body having a front opening;
   a front lens coupled to said front opening of said lamp body to thereby define a lamp chamber;
   a reflector disposed within said lamp chamber; and
   a bulb disposed in front of said reflector and serving as a light source, said bulb being disposed horizontally with respect to the longitudinal axis of the vehicles,
   wherein an inner expanded portion of said lamp body has a horizontal cross sectional shape formed into a circular arc for horizontally diffusing light emitted from said bulb.

2. A lamp unit for a vehicle according to claim 1, wherein said bulb is disposed in a direction substantially perpendicular to the direction of the axis of the vehicle.

3. A lamp unit for a vehicle according to claim 1, wherein said reflector is formed integrally with an inside portion of said lamp body, and an inner side wall of said lamp body continuously expands toward an outside portion of said lamp body.

4. A lamp unit for a vehicle according to claim 1, wherein said lamp body is formed with a bulb insertion hole formed in said inner expanded portion.

5. A lamp unit for a vehicle according to claim 1, wherein said front lens comprises steps, for horizontally diffusing light emitted by said bulb, formed in the inner side thereof.

6. A lamp unit for a vehicle according to claim 1, wherein said bulb has a filament disposed at a focal point of said reflector.

7. A lamp unit for a vehicle according to claim 6, wherein the filament is suspended in the vertical direction.

* * * * *